United States Patent
Younes et al.

(10) Patent No.: US 10,213,730 B1
(45) Date of Patent: Feb. 26, 2019

(54) PROCESS FOR ACID GAS TREATMENT AND POWER GENERATION

(71) Applicant: Saudi Arabian Oil Company, Dhahran (SA)

(72) Inventors: Mourad Younes, Abqaiq (SA); Aadesh Harale, Abqaiq (SA); Maytham Musawi, Alhasa (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 15/683,247

(22) Filed: Aug. 22, 2017

(51) Int. Cl.
| | |
|---|---|
| *B01D 53/14* | (2006.01) |
| *C01B 3/52* | (2006.01) |
| *C01B 17/04* | (2006.01) |
| *C01B 17/43* | (2006.01) |
| *C10K 1/12* | (2006.01) |

(52) U.S. Cl.
CPC .......... *B01D 53/1462* (2013.01); *C01B 3/52* (2013.01); *C01B 17/0452* (2013.01); *C01B 17/43* (2013.01); *C10K 1/124* (2013.01); *C01B 2203/0415* (2013.01);
(Continued)

(58) Field of Classification Search
CPC ...... B01D 53/14; B01D 53/52; B01D 53/526; B01D 53/74; B01D 53/81; B01D 2251/404; B01D 2257/304; C01B 17/04; C01B 17/43; C10L 3/102; C10L 3/103; C01F 11/46
See application file for complete search history.

(56) References Cited

U.S. PATENT DOCUMENTS

| | | |
|---|---|---|
| 4,769,045 A | 9/1988 | Grindley |
| 7,618,558 B2 | 11/2009 | Nielsen |

(Continued)

FOREIGN PATENT DOCUMENTS

| | | |
|---|---|---|
| EP | 2610216 A1 | 7/2013 |
| JP | 3354712 B2 | 12/2002 |

(Continued)

OTHER PUBLICATIONS

Cabello, Arturo et al.; "Sour and acid gas combustion in a 500 Wth CLC unit" 3rd International Conference on Chemical Looping, Sep. 9-11, 2014, Goteborg, Sweden; pp. 1-8.
(Continued)

*Primary Examiner* — Timothy C Vanoy
(74) *Attorney, Agent, or Firm* — Bracewell LLP; Constance G. Rhebergen; Brian H. Tompkins

(57) ABSTRACT

Systems and processes for treating acid gas from a sour gas stream are provided. A chemical looping combustion (CLC) process is provided that uses $CaCO_3$ to capture sulfur from the acid gas and produce $CaSO_4$. An acid gas treatment unit may receive an acid gas from an acid gas removal unit and produce the $CaSO_4$ and various gas and air streams for use in heat exchangers for steam production. The acid gas treatment unit may include a fuel reactor, an oxidizer reactor, and a calciner reactor. Another acid gas treatment unit may include a fuel reactor that includes the calciner function and an oxidizer reactor. A selective membrane module may be disposed between the sour gas stream and an acid gas removal unit to produce a $H_2S$ and $CO_2$ permeate that is mixed with the acid gas stream provided to the acid gas treatment unit.

46 Claims, 9 Drawing Sheets

(52) U.S. Cl.
CPC ............ *C01B 2203/0475* (2013.01); *C01B 2203/0485* (2013.01); *C01B 2203/0811* (2013.01)

(56) References Cited

U.S. PATENT DOCUMENTS

| | | | |
|---|---|---|---|
| 8,110,012 B2* | 2/2012 | Chiu | C10J 3/54 252/373 |
| 8,512,661 B2 | 8/2013 | Fan et al. | |
| 8,632,626 B2 | 1/2014 | Sceats | |
| 8,894,743 B2 | 11/2014 | Sceats | |
| 9,150,807 B2 | 10/2015 | Sceats et al. | |
| 9,481,837 B2 | 11/2016 | Velazquez-Vargas et al. | |
| 9,505,998 B2 | 11/2016 | Sceats et al. | |
| 9,550,680 B2 | 1/2017 | Andrus, Jr. et al. | |
| 9,651,252 B2* | 5/2017 | Abanades Garcia | F23J 15/02 |
| 2010/0050654 A1 | 3/2010 | Chiu | C10J 3/54 60/780 |
| 2011/0174203 A1* | 7/2011 | Salatino | F23C 10/002 110/245 |
| 2011/0176968 A1* | 7/2011 | Fan | C10J 3/12 422/139 |
| 2011/0200520 A1* | 8/2011 | Ramkumar | B01D 53/10 423/656 |
| 2014/0158939 A1* | 6/2014 | Ramkumar | B01D 53/10 252/373 |
| 2014/0377158 A1 | 12/2014 | Andrus, Jr. et al. | |
| 2016/0017798 A1 | 1/2016 | Younes et al. | |
| 2016/0017799 A1 | 1/2016 | Hoteit et al. | |

FOREIGN PATENT DOCUMENTS

| | | |
|---|---|---|
| WO | 2013098328 A1 | 7/2013 |
| WO | 2013098329 A1 | 7/2013 |

OTHER PUBLICATIONS

Garcia-Labiano, F. et al.; "Energy exploitation of acid gas with high H2S content by means of a chemical looping combustion system" Applied Energy 136 (2014); pp. 242-249.

Lallemand, Francois et al.; "Solutions for the treatment of highly sour gases" available at the website www.digitalrefining.com/article/1000356; Gas 2012; pp. 1-14.

Lockhart, Thomas et al.; "Sour oil and gas management 3.3" vol. III / New Developments: Energy Transport, Sustainability; Encyclopaedia of Hydrocarbons; pp. 237-269.

National Energy Technology Laboratory "DOE/NETL Advanced Combustion Systems: Chemical Looping Summary" Jul. 2013; 34 pages.

International Search Report and Written Opinion for related PCT application PCT/US2018/046837 (SA5737/PCT) dated Nov. 21, 2018; pp. 1-13.

\* cited by examiner

PROCESS FOR ACID GAS TREATMENT AND POWER GENERATION

BACKGROUND

Field of the Disclosure

The present disclosure generally relates to hydrocarbon processing. More specifically, embodiments of the disclosure relate to the treatment of acid gas generated during the processing of crude oil and natural gas.

Description of the Related Art

Natural resources, such as crude oil and natural gas, are processed (for example, refined) to produce usable hydrocarbons for various purposes such as fuel, industrial chemicals, solvents, etc. Hydrogen sulfide ($H_2S$) is an undesirable chemical compound that occurs naturally in crude oil and natural gas. Acid gas generated during crude oil and natural gas processing typically includes hydrogen sulfide and other undesirable compounds, The removal of acid gas components such as hydrogen sulfide, carbon dioxide ($CO_2$), carbonyl sulfide (COS), carbon disulfide ($CS_2$) and mercaptans (RSH) from gas and liquid hydrocarbon streams is a process requirement in many parts of the hydrocarbon processing industry. The oil and gas industry is facing challenges with the increasingly stringent environmental considerations coupled with the processing of natural gas and crude oil with increased sulfur levels. Developing efficient and cost effective processes in view of such challenges may be difficult.

SUMMARY $H_2S$ and $CO_2$ are traditionally stripped out from a sour gas stream using absorption systems and solvents like MEA and DEA to produce an acid gas stream that primarily includes $H_2S$ and $CO_2$. This acid gas stream is then typically fed to a Claus process where about 95% to 97% of the $H_2S$ feed stream is recovered and converted to elemental sulfur. A tail gas treatment process is then typically used to convert the remaining $H_2S$ and avoid sulfur emissions to the atmosphere. Selection of an appropriate and cost effective tail gas treatment process to follow exiting Claus plants is a challenge facing refiners and natural gas plant owners.

A chemical looping combustion (CLC) process for carbon based fuel conversion has been used in industrial practice dating back to late 19th century to early 20th century. In such as CLC process, fuel first reacts with metal oxide in a reducer (fuel reactor) such that the metal oxide is reduced to metal. The reaction products from the reducer are $CO_2$ and steam. Metal that exits the reducer enters a combustor (air reactor) where it reacts with air to regenerate the metal oxide. The metal oxide is then recycled back to the reducer. The heat of oxidation is carried by the oxidized metal and the heated spent air from the air reactor. The spent air may be used to produce steam that can be used as utility steam or to drive steam turbines for electricity generation.

As different metals react differently to different fuels (for example, hydrocarbon and sulfur species), specific oxygen carriers for specific fuels have been developed. Calcium-based particles are a good candidate for sulfur containing fuels as they permit the capture of the sulfur compounds in the calcium-based products and remove the need of a flue gas desulfurization (FGD) system that is typically used in power plants burning sulfur containing fuels.

Embodiments of the disclosure provide an improved systems and processes for the efficient and economical recovery of sulfur from acid gas without the use of thermal oxidizer. Embodiments include a calcium carbonate-based CLC process where an acid gas stream, such as an acid gas stream from an Acid Gas Removal Unit (AGR), is oxidized and sulfur is recovered as a calcium sulfate ($CaSO_4$) by-product instead of using a conventional thermal oxidizer followed by a Tail Gas Treatment Unit (TGTU) (such as Shell Claus Off-gas Treating (SCOT) or similar processes) to meet sulfur recovery requirements and reduce SOX emissions to the acceptable environmental levels.

Advantageously, embodiments of the disclosure eliminate the use of a thermal oxidizer and tail gas treatment to capture sulfur. In contrast, such conventional tail gas treatment requires sulfur components from a Claus unit to be oxidized to $SO_2$ in a thermal oxidizer and then subsequent conversion of the $SO_2$ back to $H_2S$ in a SCOT-like process. Thus, embodiments of the disclosure may replace Claus and SCOT units, and the $CaSO_4$ by-product may be used in the cement industry.

In one embodiment, a system is provided that includes an acid gas treatment unit operable to treat an acid gas stream that includes hydrogen sulfide. The acid gas treatment unit includes a fuel reactor operable to receive the acid gas stream and calcium oxide, such that the fuel reactor is further operable to react the hydrogen sulfide with the calcium oxide to produce calcium sulfide and a first gas stream including water vapor and carbon dioxide. The acid gas treatment unit also includes an oxidizer reactor operable to receive the calcium sulfide and a first air stream, such that the oxidizer reactor is further operable to produce calcium sulfate and an oxygen-lean second air stream, the oxygen-lean air stream including no more than 15% by weight oxygen. The acid gas treatment unit also includes a calciner reactor operable to receive the oxygen-lean second air stream and calcium carbonate. The calciner reactor is further operable to produce the calcium oxide and a second gas stream, such that the second gas stream including carbon dioxide.

In some embodiments, the system includes one or more heat exchangers operable to receive at least one of the first gas stream, the second gas stream, and the oxygen-lean second air stream, such that the one or more heat exchangers are further operable to produce steam using heat from the first gas stream, the second gas stream, the oxygen-lean second air stream, or any combination thereof. In some embodiments, the one or more heat exchangers are further operable to heat the first air stream using heat from the first gas stream, the second gas stream, or a combination thereof. In some embodiments, the one or more heat exchangers are further operable to heat the acid gas stream before the fuel reactor receives the acid gas stream. In some embodiments, the system includes a power generation unit operable to receive the steam from the one or more heat exchangers and produce power and reduced pressure steam. In some embodiments, the reduced pressure steam is provided to regeneration column of an acid gas removal unit. In some embodiments, the system includes an acid gas removal unit operable to receive a sour gas stream and produce the acid gas stream, the acid gas removal unit having an absorption column and a regeneration column. In some embodiments, the system includes one or more heat exchangers operable to transfer heat from the oxidizer reactor to the regeneration column. In some embodiments, the system includes a selective membrane module disposed between a sour gas stream and an acid gas removal unit operable to produce the acid gas stream, the selective membrane operable to produce a permeate stream having an increased concentration of carbon dioxide and hydrogen sulfide as compared to the sour gas stream and a retentate stream having a reduced concentration of carbon dioxide and hydrogen sulfide as compared to the sour gas stream. In some embodiments, the permeate stream is mixed with the acid gas stream before being received by the fuel reactor and the acid gas removal unit is operable to receive the retentate stream. In some embodiments, the oxidizer reactor includes a fast riser reactor. In some embodiments, the calciner reactor includes a fluidized bed reactor.

In another embodiment, a method is provided that includes receiving an acid gas stream and calcium oxide at a fuel reactor of an acid gas treatment unit, the acid gas stream including hydrogen sulfide, and operating the fuel reactor to react the hydrogen sulfide with calcium oxide to produce calcium sulfide and a first gas stream that includes water vapor and carbon dioxide. The method further includes operating an oxidizer reactor of the acid gas treatment unit to receive the calcium sulfide and a first air stream to produce calcium sulfate and an oxygen-lean second air stream such that the oxygen-lean air stream includes no more than 15% by weight oxygen. The method also includes operating a calciner reactor to receive the oxygen-lean air stream and calcium carbonate and produce the calcium oxide and a second gas stream such that the second gas stream includes carbon dioxide.

In some embodiments, the method includes operating one or more heat exchangers to receive at least one of the first gas stream, the second gas stream, and the oxygen-lean second air stream to produce steam using heat from the first gas stream, the second gas stream, the oxygen-lean second air stream, or any combination thereof. In some embodiments, the method includes operating the one or more heat exchangers heat the acid gas stream before receiving the acid gas stream and calcium oxide at the fuel reactor of the acid gas treatment unit. In some embodiments, the method includes operating a power generation unit to receive the steam from the one or more heat exchangers and produce power and reduced pressure steam. In some embodiments, the method includes providing the reduced pressure steam to a regeneration column of an acid gas removal unit. In some embodiments, the acid gas stream is received from an acid gas removal unit. In some embodiments, the method includes operating a selective membrane module disposed between a sour gas stream and an acid gas removal unit to produce a permeate stream having an increased concentration of carbon dioxide and hydrogen sulfide as compared to the sour gas stream and retentate stream having a reduced concentration of carbon dioxide and hydrogen sulfide as compared to the sour gas stream. In some embodiments, the method includes mixing the permeate stream with the acid gas stream before being received by the fuel reactor. In some embodiments, the method includes removing the water vapor from the first gas stream to produce a $CO_2$ stream when the acid gas stream does not include hydrocarbons. In some embodiments, operating the oxidizer reactor of the acid gas treatment unit to receive the first gas stream when the first gas stream includes an amount of carbon monoxide below a first threshold amount and an amount of hydrogen below a second threshold amount. In some embodiments, operating the fuel reactor includes operating the fuel reactor at a temperature in the range of 600° C. to 900° C. In some embodiments, operating the oxidizer reactor includes operating the oxidizer reactor at a temperature in the range of 800° C. to 1100° C. In some embodiments, operating the calciner reactor includes operating the oxidizer reactor at a temperature in the range of 800° C. to 1000° C.

In another embodiment, a system is provided that includes an acid gas treatment unit operable to treat an acid gas stream that includes hydrogen sulfide. The acid gas treatment unit includes a fuel reactor operable to receive the acid gas stream and calcium carbonate. The fuel reactor is further operable to produce carbon dioxide and calcium oxide from the calcium carbonate and react the hydrogen sulfide with the calcium oxide to produce calcium sulfide and a first gas stream that includes water vapor and carbon dioxide. The acid gas treatment unit also includes an oxidizer reactor operable to receive the calcium sulfide and a first air stream, the oxidizer reactor further operable to produce calcium sulfate and an oxygen-lean second air stream, the oxygen-lean air stream having no more than 15% by weight oxygen.

In some embodiments, the system includes one or more heat exchangers operable to receive the first gas stream and the oxygen-lean second air stream, the one or more heat exchangers further operable to produce steam using heat from the first gas stream, the oxygen-lean second air stream, or a combination thereof. In some embodiments, the one or more heat exchangers are further operable to heat the first air stream using heat from the first gas stream, the oxygen-lean second air stream, or a combination thereof. In some embodiments, the one or more heat exchangers are further operable to heat the acid gas stream before the fuel reactor receives the acid gas stream. In some embodiments, the system includes a power generation unit operable to receive the steam from the one or more heat exchangers and produce power and reduced pressure steam. In some embodiments, the reduced pressure steam is provided to regeneration column of an acid gas removal unit. In some embodiments, the system includes an acid gas removal unit operable to receive a sour gas stream and produce the acid gas stream, the acid gas removal unit including an absorption column and a regeneration column. In some embodiments, the system includes a selective membrane module disposed between a sour gas stream and an acid gas removal unit operable to produce the acid gas stream, such that the selective membrane is operable to produce a permeate stream having an increased concentration of carbon dioxide and hydrogen sulfide as compared to the sour gas stream and retentate stream having a reduced concentration of carbon dioxide and hydrogen sulfide as compared to the sour gas stream. In some embodiments, the permeate stream is mixed with the acid gas stream before being received by the fuel reactor and the acid gas removal unit is operable to receive the retentate stream. In some embodiments, the oxidizer reactor includes a fast riser reactor.

In another embodiment, a method is provided that includes receiving an acid gas stream and calcium carbonate at a fuel reactor of an acid gas treatment unit, the acid gas stream including hydrogen sulfide, and operating the fuel reactor to produce carbon dioxide and calcium oxide from the calcium carbonate and react the hydrogen sulfide with the calcium oxide to produce calcium sulfide and a first gas stream that includes water vapor and carbon dioxide. The method also includes operating an oxidizer reactor of the acid gas treatment unit to receive the calcium sulfide and a first air stream to produce calcium sulfate and an oxygen-lean second air stream, the oxygen-lean air stream having no more than 15% by weight oxygen. In some embodiments, the method includes operating one or more heat exchangers to receive at least one of the first gas stream and the oxygen-lean second air stream to produce steam using heat from the first gas stream, the oxygen-lean second air stream, or a combination thereof. In some embodiments, the method includes operating the one or more heat exchangers to heat the acid gas stream before receiving the acid gas stream at the fuel reactor of the acid gas treatment unit. In some embodiments, the method includes operating a power generation unit to receive the steam from the one or more heat exchangers and produce power and reduced pressure steam. In some embodiments, the method includes providing the reduced pressure steam to a regeneration column of an acid gas removal unit. In some embodiments, the method includes operating a selective membrane module disposed between a sour gas stream and an acid gas removal unit to produce a permeate stream having an increased concentration of carbon dioxide and hydrogen sulfide as compared to the sour gas stream and a retentate stream having a reduced concentration of carbon dioxide and hydrogen sulfide as compared to the sour gas stream. In some embodiments, the method includes mixing the permeate stream with the acid gas stream before being received by the fuel reactor. In some embodiments, the method includes removing the water vapor from the first gas stream to produce a $CO_2$ stream when the acid gas stream does not include hydrocarbons. In some embodiments, the method includes operating the oxidizer reactor of the acid gas treatment unit to receive the first gas stream when the first gas stream includes an amount of carbon monoxide below a first threshold amount and an amount of hydrogen below a second threshold amount. In some embodiments, operating the fuel reactor com includes operating the fuel reactor at a temperature in the range of 800° C. to 900°. In some embodiments, operating the oxidizer reactor includes operating the oxidizer reactor at a temperature in the range of 850° C. to 1100° C.

DETAILED DESCRIPTION

The present disclosure will be described more fully with reference to the accompanying drawings, which illustrate embodiments of the disclosure. This disclosure may, however, be embodied in many different forms and should not be construed as limited to the illustrated embodiments. Rather, these embodiments are provided so that this disclosure will be thorough and complete, and will fully convey the scope of the disclosure to those skilled in the art.

As used in the disclosure, the term "unit" may refer to one or more equipment items and may, in some embodiments, include or one or more subunits. In some embodiments, equipment items may include reactors, reactor vessels, heaters, exchangers, pipes, pumps, compressors, controllers and various combinations thereof.

As used in the disclosure, the term "rich" refers to an amount of at least about 50% by mole, weight, or volume of a compound or class of compounds in a stream. In some embodiments, the term "rich" may refer to an amount of at least about 70% by mole, weight, or volume of a compound or class of compounds in a stream.

As used in the disclosure, the term "lean" may refer to an amount of no more than generally about 15% by mole, weight, or volume of a compound or class of compounds in a stream. In some embodiments, the term "lean" may refer to an amount of at least about 10% by mole, weight, or volume of a compound or class of compounds in a stream.

Embodiments of the disclosure include systems and processes having a chemical looping combustion (CLC) process to treat acid gas and generate power while reducing sulfur emissions. As described in the disclosure, calcium carbonate (such as that found in limestone) is used to capture the sulfur directly from the acid gas and produce a $CaSO_4$ by-product. Such embodiments advantageously provide for economic and efficient valorization of acid gas and achieve an increased sulfur recovery as compared to exiting and alternative techniques. Moreover, embodiments of the disclosure further provide a fuel to thermal energy conversion process for acid gas that does not require sweetening the gas before combustion. Moreover, such embodiments have an improved operating flexibility as compared to exiting and alternative processes. Embodiments of the disclosure further eliminate the use of Claus and tail gas treatment processes and can generate power by combining gas treatment and power generation in a single process.

Figure 1:
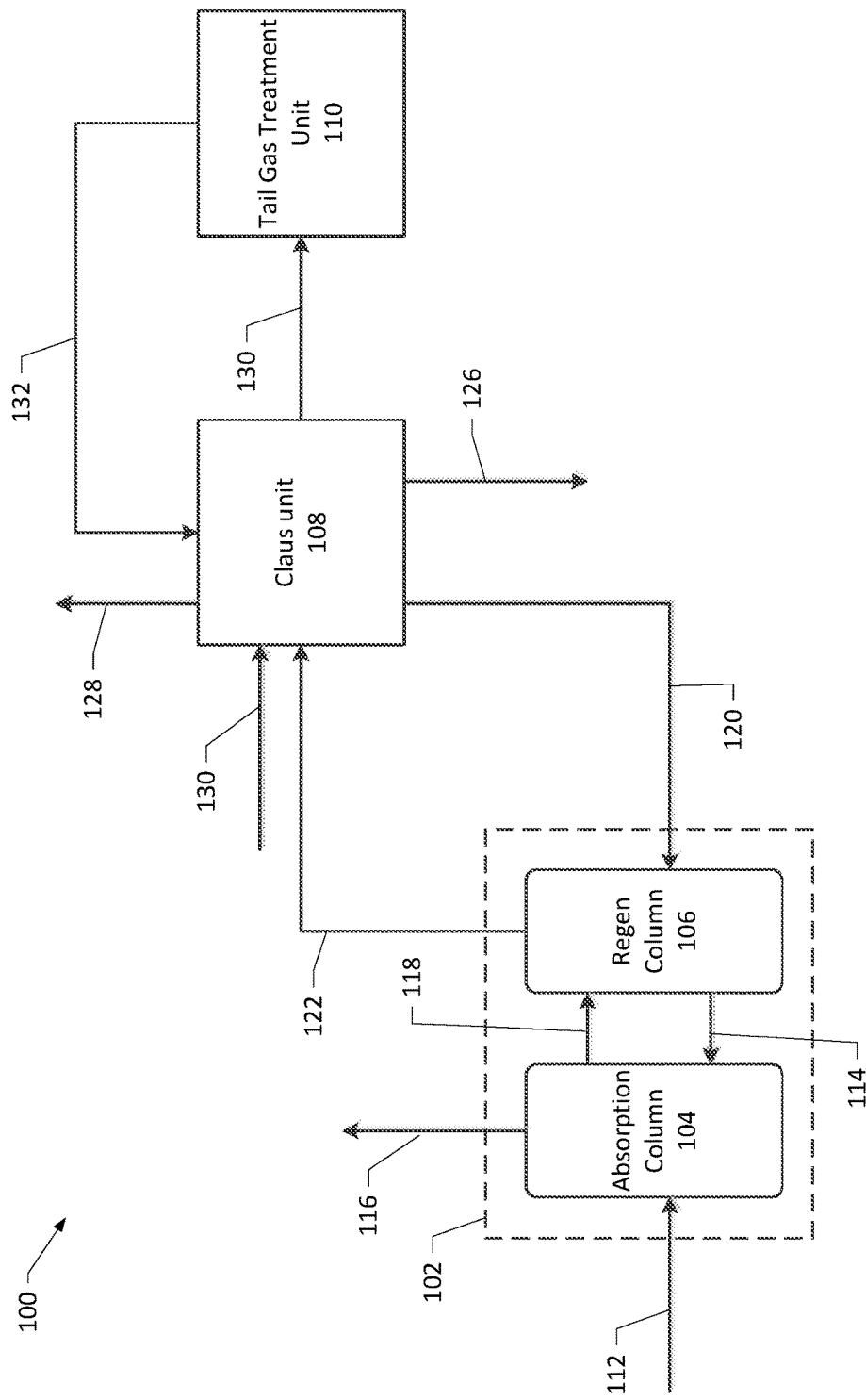
FIG. 1 is schematic diagram of a prior art gas treatment process for removing acid gases from a sour gas stream.

FIG. 1 depicts a prior art gas treatment process 100 for treating acid gases in a sour gas stream. As shown in FIG. 1, the process 100 includes an Acid Gas Removal (AGR) unit 102 having an absorption column 104 and a regeneration column 106. The system 102 also includes a Claus unit 108 and tail gas treatment unit 110 which operate with the AGR unit 102 as described in detail infra.

As shown in FIG. 1, a sour gas stream 112 is fed to the absorption column 104 of the AGR unit 102. A lean loaded solvent stream 114 from the regeneration column 106 absorbs $H_2S$ and $CO_2$ from the sour gas stream 112. A sweetened gas stream exits the absorption column 104 as a sales gas stream 116 that may be further treated to remove other impurities or valuable hydrocarbons. The sales gas stream 116 may also be routed to a pipeline for transportation and used for industrial purposes or in a power generation plant. The solvent used in the AGR unit 102 may depend on the amounts of $H_2S$ and $CO_2$ in the sour gas feed stream 112 and the desired quality of the sales gas stream 116 exiting the absorption column 104.

An $H_2S$ and $CO_2$ loaded solvent stream 118 exits the absorption column 104 and is routed to the regeneration column 106. A steam stream 120 is injected to the regeneration column 106 to provide heat for stripping the $H_2S$ and $CO_2$ from the solvent and for regenerating the solvent. The lean loaded solvent stream 114 is recirculated to the absorption column 104. An acid gas stream 122 that includes mostly $H_2S$ and $CO_2$ exits the regeneration column 106 and is routed to the Claus unit (CU1) 108.

The acid gas stream 122 is oxidized in the Claus unit (CU1) 108 in the presence of oxygen and then contacted with a catalyst to produce an elemental sulfur stream 126 while the remaining gases are vented from the Claus unit (CU1) 108 via a flue gas stream 128. The oxygen may be provided to the Claus unit (CU1) 108 by an air or pure oxygen stream 130. As the balance of the reactions occurring in the Claus unit (CU1) 108 are exothermic, the remaining energy is used to produce the steam stream 120 used in the regeneration column 106 of the AGR unit 102.

A tail gas stream 130 exits the Claus unit (CU1) 108 and is fed to the tail gas treatment unit (TGTU1) 110. The tail gas treatment unit (TGTU1) 110 converts SOX in the tail gas stream 130 to $H_2S$. An H2S stream 132 from the tail gas treatment unit (TGTU1) 110 is fed back to the Claus unit (CU1) 108 to increase the sulfur recovery rate.

Figure 2:
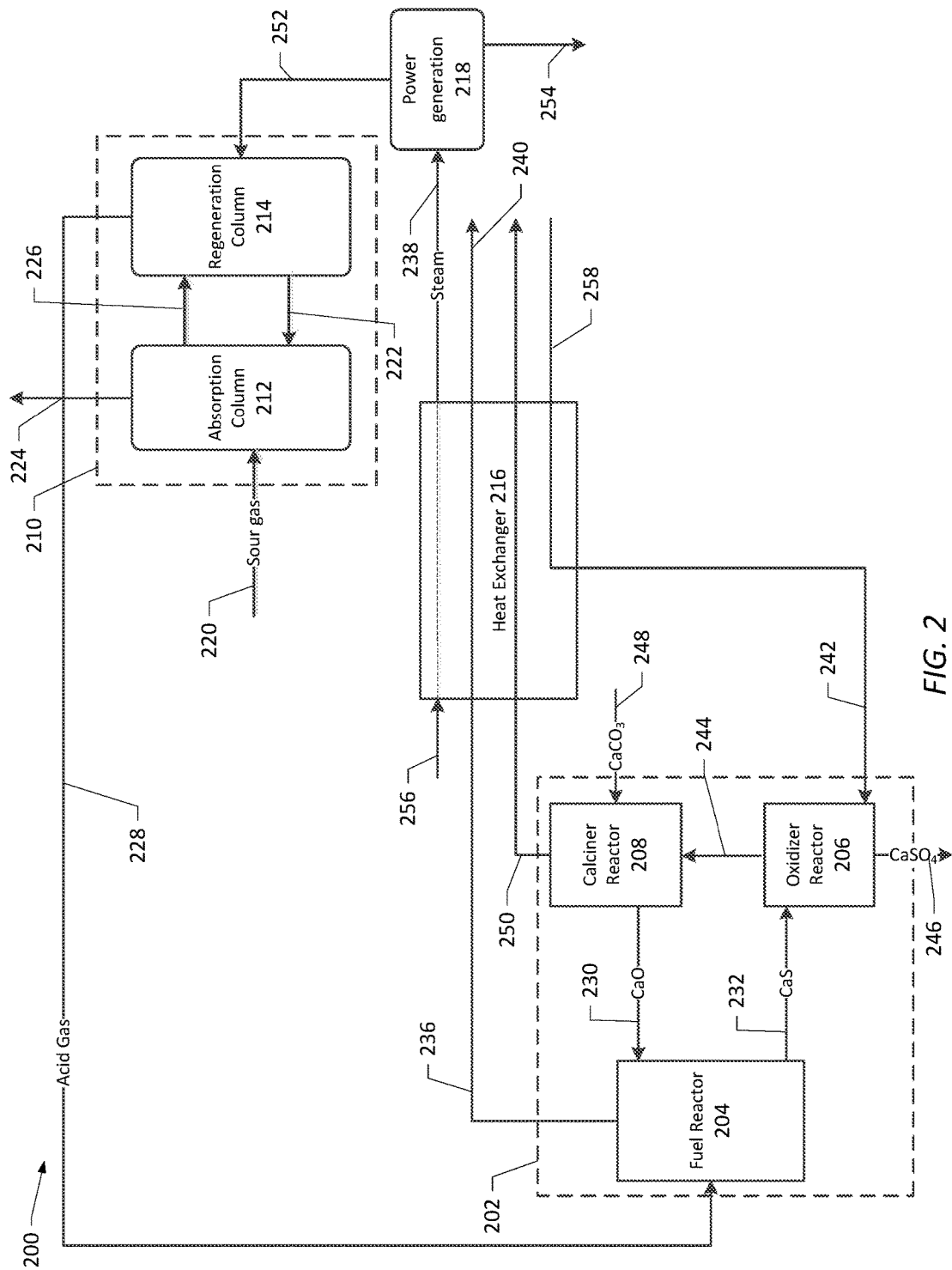
FIG. 2 is a schematic diagram of a system for processing acid gas in a sour gas stream in accordance with an embodiment of the disclosure.
Figure 3:
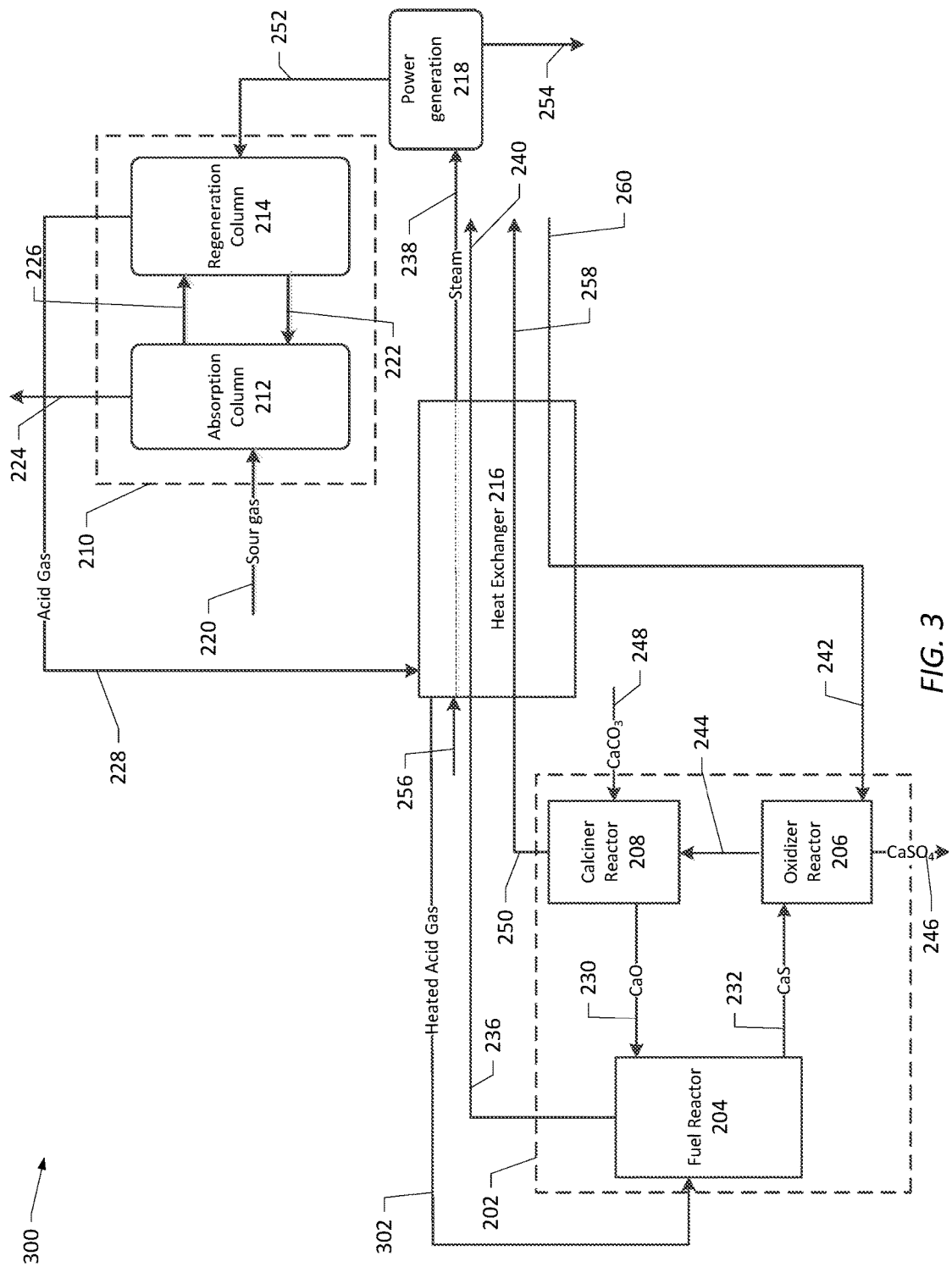
FIG. 3 is a schematic diagram of the system of FIG. 2 that includes preheating an acid gas stream in accordance with an embodiment of the disclosure.
Figure 4:
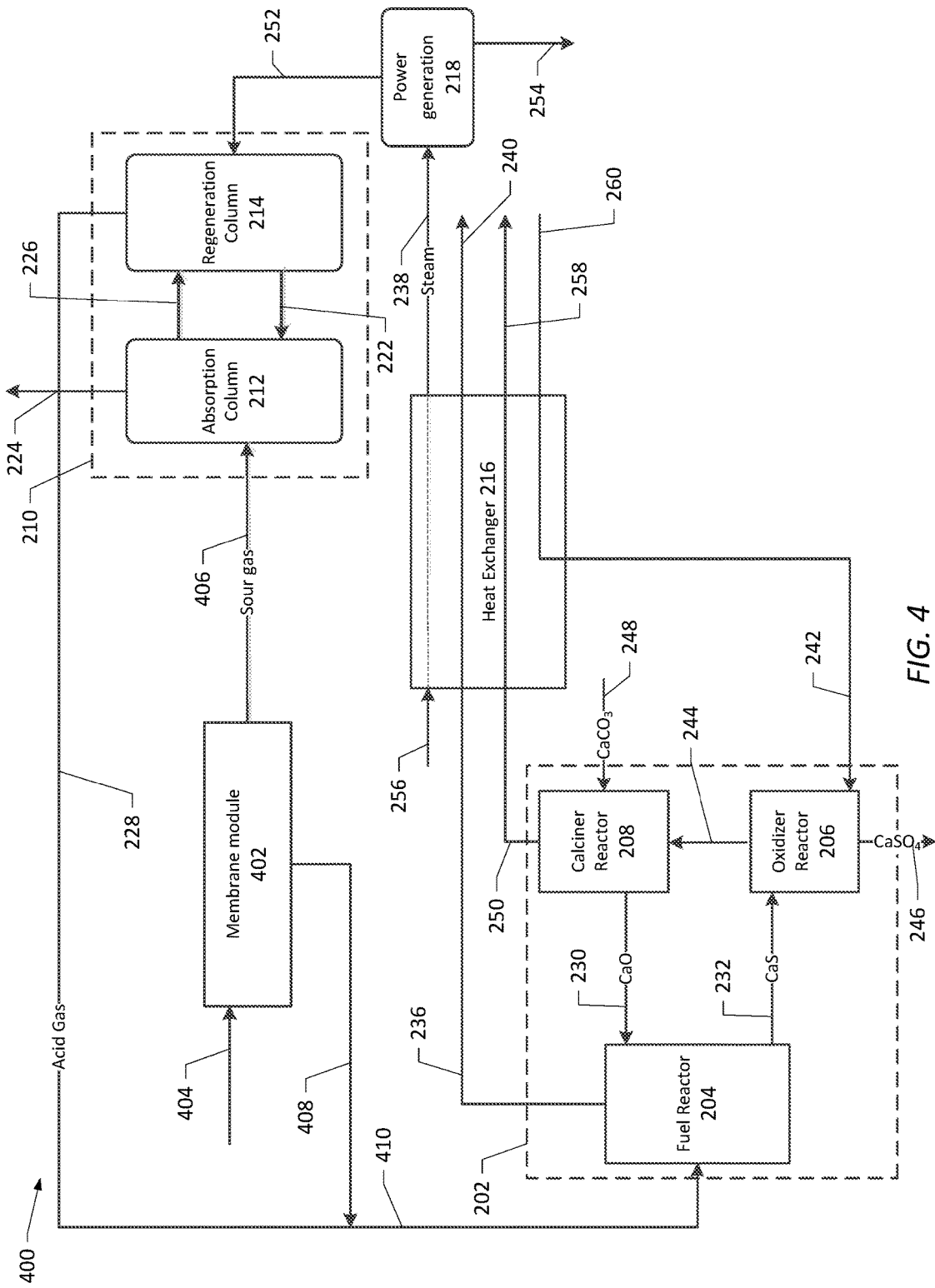
FIG. 4 is a schematic diagram of the system of FIG. 2 with a membrane module in accordance with an embodiment of the disclosure.

In contrast to the prior art process shown in FIG. 1, embodiments of the disclosure avoid or reduce the use of a Claus unit and eliminate the use of a TGTU for the treatment of acid gas. Embodiments of the disclosure use an environmental-friendly natural material, $CaCO_3$, as a sulfur capture material uses the oxidized form as oxygen carrier. The by-product produced by the systems and processes described infra may be used in the cement industry. Additionally, embodiments of the disclosure do not require thermal oxidizers and hydrogen for the reduction of $SO_2$. FIGS. 2-4 depict various embodiments for the treatment of sulfur gas that include these advantages and benefits.

FIG. 2 depicts a system 200 for processing acid gas from a sour gas stream in accordance with an embodiment of the disclosure. As shown in FIG. 2, the system 200 includes a chemical looping combustion process 202 having a fuel reactor (F1) 204, an oxidizer reactor (O1) 206, and a calciner reactor 208 that processes acid gas in accordance with the techniques described in the disclosure. FIG. 2 further shows an acid gas removal (AGR) unit 210 having an absorption column 212 and a regeneration column 214 that operate in a manner similar to the absorption column 104 and regeneration column discussed above. The system 200 also includes a heat exchanger 216 (that is, one or more heat exchangers configured to transfer heat between two or more streams) and a power generation unit 218.

As shown in FIG. 2, a sour gas stream 220 is fed to the absorption column 212 of the AGR unit 210. A lean loaded solvent stream 222 from the regeneration column 214 absorbs $H_2S$ and $CO_2$ from the sour gas stream 200. A sales gas stream 224 exits the absorption column 212 and may be treated to remove other impurities or useful hydrocarbons or routed to a pipeline for transportation for industrial purposes or power generation. As noted above, the solvent used in the AGR unit 210 may depend on the amounts of $H_2S$ and $CO_2$ in the sour gas feed stream 220 and the desired quality of the sales gas stream 224 exiting the absorption column 212. A $H_2S$ and $CO_2$ loaded solvent stream 226 exits the absorption column 212 and is routed to the regeneration column 214. As discussed infra, steam may be provided from the power generation unit 218 to provide heat for stripping the $H_2S$ and $CO_2$ and regenerating the solvent, such that the lean loaded solvent stream 222 is recirculated to the absorption column 204. An acid gas stream 228 that includes $H_2S$ and $CO_2$ exits the regeneration column 214 and is routed to the acid gas treatment unit 202.

The acid gas stream 228 exiting the regeneration column 214 is provided to the fuel reactor 204 of the CLC process 202. $H_2S$ from the acid gas stream 228 reacts with calcium oxide (CaO) in the fuel reactor 204 to produce calcium sulfide (CaS) and water vapor. A CaO stream 230 may be fed to the fuel reactor 204 from the calciner reactor 208. The solid CaS may be separated from the water vapor and remaining gases via a suitable solid/gas separated device in the fuel reactor 204. In some embodiments, for example, the solid/gas separation device may be cyclone. A solid CaS stream 232 may exit the fuel reactor 204 and be provided to the oxidizer reactor 206.

In some embodiments, the acid gas stream 228 may include hydrocarbons. In such embodiments, the hydrocarbons reformed into CO, $CO_2$, and $H_2$. These gases, remaining $CO_2$, and steam may exit the fuel reactor 204 as a gas stream 236. The gas stream 236 may be provided to the heat exchanger 216 where the stream 236 is cooled and used to produce steam 238. In some embodiments, the steam 238 may be used for heating applications or power generation. For example, the steam 238 may be provided to the power generation unit 218 or the regeneration column 214. The cooled gas stream exits the heat exchanger 216 as stream 240 shown in FIG. 2 and, in some embodiments, may be vented, flared, or combusted in a boiler or gas turbine.

The solid CaS stream 232 from the fuel reactor 204 is provided to the oxidizer reactor 206 where it is oxidized into calcium sulfate ($CaSO_4$). The oxidizer reactor 206 also receives an air stream 242. The oxidization reaction in the oxidizer reactor strips oxygen from air provided by the air stream 242 such that an oxygen-lean air is produced (that is, air having no more than 15% oxygen). The oxygen-lean air may be separated from the solid CaSO4 via a suitable solid/gas separated device in the fuel reactor 204. In some embodiments, for example, the solid/gas separation device may be cyclone. The separated oxygen-lean air may exit the oxidizer reactor 206 as oxygen-lean air stream 244. As will be appreciated, the oxidation reaction in the oxidizer reactor 206 is exothermic and aids in balancing the chemical looping combustion process 202.

A CaSO4 stream 246 may exit the oxidizer reactor 206. In some embodiments, the CaSO4 may be purged from the system 200. In other embodiments, a portion of the $CaSO_4$ may be purged from the system 200, while another portion of the $CaSO_4$ may be provided to the calciner reactor 208. In such embodiments, the stream 230 provided from the calciner reactor 208 to the fuel reactor 204 may include a mixture of CaO and $CaSO_4$, and the stream 232 exiting the fuel reactor 204 may include a mixture of CaS and $CaSO_4$. As will be appreciated, the presence of the $CaSO_4$ in the oxidizer reactor 206 and the fuel reactor 204 may aid in the transfer of energy between the reactors of the CLC process 202 and provide a heat balance.

The oxygen-lean air stream 244 exiting the oxidizer reactor 206 may be provided to the calciner reactor 208. A $CaCO_3$ stream 248 is also provided to the calciner reactor 208. As noted above, in some embodiments a portion of the $CaSO_4$ stream 246 exiting the oxidizer reactor 206 may be provided to the calciner reactor 208. The oxygen-lean air stream 244 may aid the calcination reaction occurring in the calciner reactor 208 to decompose $CaCO_3$ to CaO and $CO_2$. The solid CaO in the calciner reactor 208 may be separated from gaseous effluents via a suitable solid/gas separated device in the oxidizer reactor 206. In some embodiments, for example, the solid/gas separation device may be cyclone. As shown in FIG. 2, the separated CaO is provided to the fuel reactor 204 via CaO stream 230 to close the loop.

The separated gaseous effluents may exit the calciner reactor 208 via a gaseous effluents stream 250. The gaseous effluents stream 250 may be provided to the heat exchanger 216 to assist in production of the steam 238. In some embodiments, the steam 238 may be used for heating applications or power generation.

As discussed above, the steam 238 may be provided to the power generation unit 218. The power generation unit 218 may include, for example, a steam turbine that drives an electric generator. In such embodiments, a slip low pressure stream 252 is bled from the power generation unit 218 to provide the regeneration column 214 with the appropriate energy for the stripping of the acid gases out of the acid gas-loaded solvent. The remaining steam may be condensed in condensers to produce condensed steam stream 254 and be provided back to the heat exchanger 216 in addition to makeup water stream 256 to produce the steam 238 and makeup any steam losses. The cooled gaseous effluents stream exits the heat exchanger 216 as stream 258 shown in FIG. 2

In some embodiments, the heat used for operation of the regeneration column 214 may be provided from the oxidizer reactor 206 via a thermal linkage between the regeneration column 214 and the oxidizer reactor 206. For example, the thermal linkage may be one or more heat exchangers disposed between the regeneration column 214 and the oxidizer reactor 206, using a fluid to transfer heat to the regeneration column 214 and another fluid to remove heat from the oxidizer reactor 206 such that the fluids exchange heat in the heat exchanger or using the same fluid or solid to transfer heat to the regeneration column 214 and remove heat from the oxidizer reactor 206. In such embodiments, the heat exchanger may be different or separate from the heat exchanger bundle 216. In some embodiments, the heat exchanger 216 may be used to heat an air stream 260 so that the air stream 242 provided to the oxidizer reactor 206 is heated before its introduction into the reactor 206.

The fuel reactor 204 may be any suitable type of solid/gas reactor known in the art and may, in some embodiments, be a bubbling bed, fluidized bed, or moving bed reactor. In some embodiments, the oxidizer reactor 206 may be a fast riser type reactor. In other embodiments, the oxidizer reactor 206 any suitable type of solid/gas reactor known in the art and may, in some embodiments, be a bubbling bed, fluidized bed, or moving bed reactor. In some embodiments, the calciner reactor 208 may be a fluidized bed reactor. In other embodiments, the calciner reactor 208 any suitable type of solid/gas reactor known in the art and may, in some embodiments, be a bubbling bed reactor or moving bed reactor. As will be appreciated by those of ordinary skill in the art, bubbling bed, fluidized bed, or moving bed reactors may use a suitable solid/gas separation component such as a cyclone, and that interconnected beds may use sealing loops to prevent gas leakage between the reactors and fluidization mediums to provide for circulation of solids.

In some embodiments, the acid gas stream 228 may not include hydrocarbons and may be composed of $H_2S$, $CO_2$ and water. In such embodiments, the water may be stripped from the acid gas stream 228 to produce a high purity $CO_2$ stream that may be used for storage or other purposes. In such embodiments, the stream 236 exiting the fuel reactor 204 may only include $CO_2$, and the cooled stream 240 exiting the heat exchanger 216 may be fed to a gas processing unit to capture $CO_2$ at a specific purity.

In some embodiments, the acid gas stream 228 may include a decreased amount of hydrocarbons as compared to other embodiments. In embodiments in which the acid gas stream 228 has a decreased amount of hydrocarbons, the stream 236 exiting the fuel reactor 204 may retain some energy content due to the presence of CO and $H_2$ produced by the hydrocarbon reforming occurring in the fuel reactor 204. In such embodiments, if the energy content of the stream 236 is sufficiently low, the stream 236 may be fed directly to the oxidizer reactor 206 with the air stream 242 for complete combustion of the CO and $H_2$. The resultant product may exit the oxidizer reactor 206 via the stream 244, be provided to the calciner reactor 208, and exit the calciner reactor 208 via the stream 250 to be provided to the heat exchanger 216. Such embodiments thus avoid the use of a separate combustion device to combust the stream 236 exiting the fuel reactor 204.

In some embodiments, a slip stream from the sour gas feed 220 may be fed to the fuel reactor 204, such that the gas stream 236 has increased energy content. In such embodiments, the stream 236 may be provided directly to the oxidizer reactor 206, to a separate combustion chamber or boiler, or to the heat exchanger 216 to be cooled. In embodiments in which the stream 236 is provided to the heat exchanger 216, then the cooled stream 240 may be compressed and fed to a gas turbine operated in a combined cycle or polygeneration cycle to complement the power and steam production of the system 200.

FIG. 3 depicts a system 300 for processing acid gas in a sour gas stream in accordance with another embodiment of the disclosure. As shown in FIG. 3, the system 300 includes the components of system 200 but additionally includes preheating the acid gas stream 228 before providing the acid gas stream to the fuel reactor 204. As will be appreciated, preheating the acid gas stream 228 may reduce the heat requirements of the fuel reactor 204 as compared to directly feeding the acid gas stream to the fuel reactor 204.

As shown in FIG. 3, the acid gas stream 228 may be provided to the heat exchanger 216 before being provided to the fuel reactor 204. The acid gas stream 228 may be heated in the heat exchanger 216 to produce heated acid gas stream 302. The acid gas stream 228 may be heated using the streams provided to the heat exchanger 216, such as the gas stream 236, the gaseous effluents stream 250, or both. As shown in FIG. 3, the heated acid gas stream 302 may be provided to the fuel reactor 204.

FIG. 4 depicts a system 400 for processing acid gas in a sour gas stream in accordance with another embodiment of the disclosure. As shown in FIG. 4, the system 400 includes the components of system 200 but additionally includes a selective membrane module 402 disposed upstream of the AGR unit 202.

As shown in FIG. 4, a sour gas stream 404 is provided to the selective membrane module 402. The selective membrane module 402 may have an $H_2S$ and $CO_2$ selective membrane for removal of $H_2S$ and $CO_2$ from the sour gas stream 404. The retentate (also referred as "reject") stream 406 from the selective membrane module 402 having a reduced amount of $H_2S$ and $CO_2$ is provided to the AGR unit 210 for further removal of acid gas components (such as remaining $H_2S$ and $CO_2$). The permeate stream 408 from the selective membrane module 402 may be merged with the acid gas stream 228 exiting the regeneration column 214 to form a stream 410 (referred to as an "acid gas mix") that is provided to the fuel reactor 204 of the acid gas treatment unit 202.

In the embodiment shown in FIG. 4, the selective membrane module 402 may slip some hydrocarbons in the permeate stream 408, resulting in an increase in the energy content of the gas stream 236 exiting the fuel reactor 204. In some embodiments, a portion of the sour gas stream 404 may be mixed with the stream 410 to further increase the energy content of the resulting gas stream 236 exiting the fuel reactor 204. In such embodiments, the gas stream 236 may be used in combustion in a gas turbine in a combined cycle or cogeneration application.

As will be appreciated, the selective membrane unit 402 may result in a reduced load on the AGR unit 210, thus reducing solvent losses and stream consumption in the regeneration unit 214. In some embodiments, the selective membrane unit 402 may be retrofitted to exiting systems to debottleneck an AGR unit, such as for expansion of a gas plant.

Figure 5:
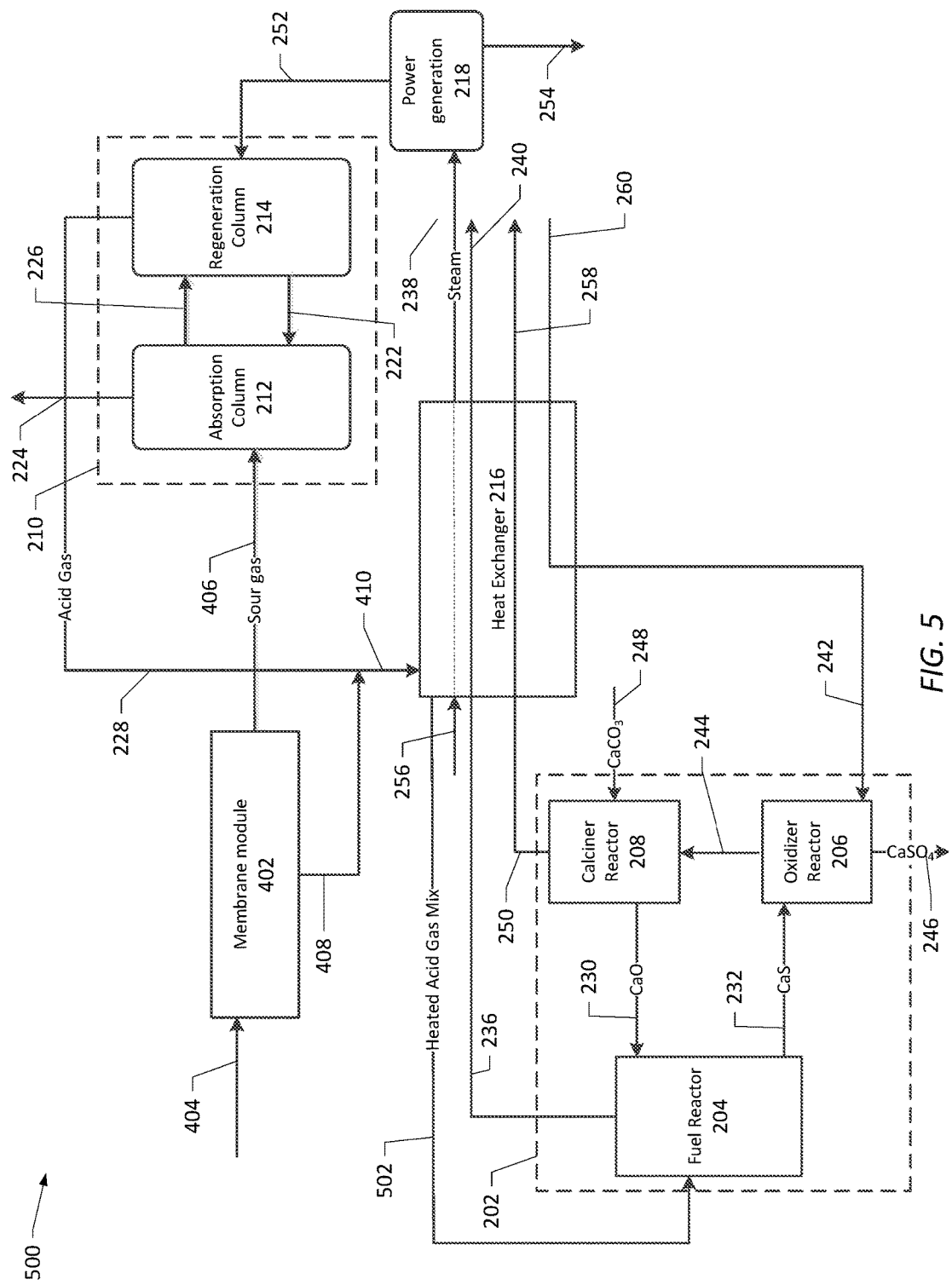
FIG. 5 is a schematic diagram of the system of FIG. 4 that includes preheating an acid gas stream in accordance with an embodiment of the disclosure.

FIG. 5 depicts a system 500 for processing acid gas in a sour gas stream in accordance with another embodiment of the disclosure. As shown in FIG. 5, the system 500 includes the components of system 400 but additionally includes preheating the acid gas mix stream 410 before providing the acid gas mix stream 410 to the fuel reactor 204. As will be appreciated, preheating the acid gas mix stream 410 may reduce the heat requirements of the fuel reactor 204 as compared to directly feeding the acid gas mix to the fuel reactor 204.

As discussed above, the permeate stream 408 from the selective membrane module 402 may be merged with the acid gas stream 228 exiting the regeneration column 214 to form the acid gas mix stream 410. As shown in FIG. 5, the acid gas mix stream 410 may be provided to the heat exchanger 216 before being provided to the fuel reactor 204. The stream 410 may be heated in the heat exchanger 216 to produce heated acid gas mix stream 502. The acid gas mix stream 410 may be heated using the streams provided to the heat exchanger 216, such as the gas stream 236, the gaseous effluents stream 250, or both. As shown in FIG. 5, the heated acid gas mix stream 502 may be provided to the fuel reactor 204.

In the embodiments described in FIGS. 2-5, each reactor of the CLC process may be operated within a temperature range to provide for the expected reactions. For example, in some embodiments, the fuel reactor may be operated in the range of about 600° C. to about 900° C. In some embodiments, the fuel reactor 204 may be operated at about 820° C. The fuel reactor 204 may be operated to ensure CaO reacts selectively with $H_2S$ and to ensure that $CO_2$ carbonation is minimized, thus eliminating the use of solids circulation as only $CaSO_4$ would be produced. As noted above, when no hydrocarbons are present in the acid gas stream provided to the fuel reactor, the gas stream 236 exiting the fuel reactor includes mostly steam and $CO_2$, enabling the production of a high purity $CO_2$ steam.

In some embodiments, the oxidizer reactor 206 may be operated at a temperature in the range of about 800° C. to about 1100° C. In some embodiments, for example, the oxidizer reactor 206 may be operated at a temperature at about 900° C., or in some embodiments, above 900° C. or above the operating temperature of the calciner reactor 208 to provide heat to the calciner reactor 208.

In some embodiments, the calciner reactor 208 may be operated at a temperature in the range of about 800° C. to about 1000° C. In some embodiments, for example, the calciner may be operated at a temperature of about 900° C.

Figure 6:
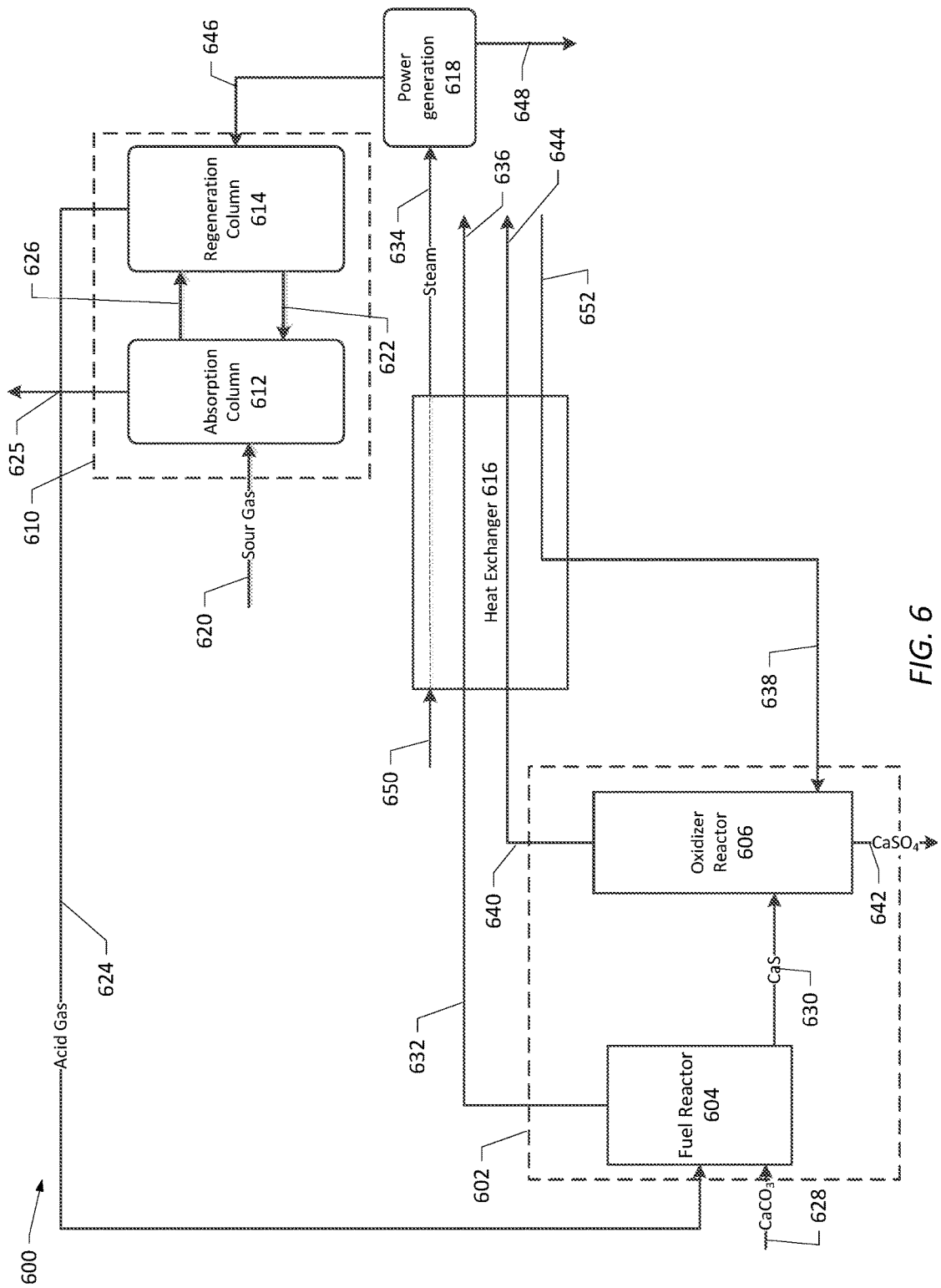
FIG. 6 is a schematic diagram of a system for processing acid gas in a sour gas stream in accordance with an embodiment of the disclosure.

In some embodiments, the calciner and fuel reactor of the CLC process may be combined into a single reactor. FIG. 6 depicts a system 600 for processing acid gas in a sour gas stream in accordance with another embodiment of the disclosure. As shown in FIG. 6, the system 600 includes a chemical looping combustion process (CL1) 602 having a fuel reactor (F1) 604 and an oxidizer reactor (O1) 606 that processes acid gas in accordance with the techniques described in the disclosure. As discussed infra, the calciner function is integrated into the fuel reactor 604 and $CaCO_3$ is injected into the fuel reactor 604. In such embodiments, solids are not recirculated in the CLC process 602 and are passed once through the process 602. $CaCO_3$ is fed to the fuel reactor 604 where it is decomposed to CaO that reacts with the sulfur to produce CaS. CaS from the fuel reactor is fed to the oxidizer reactor 606 to provide $CaSO_4$.

As shown in FIG. 6, the system 600 also includes an acid gas removal (AGR) unit 610 having an absorption column 612 and a regeneration column 614 that operate in a manner similar to the absorption column 104 and regeneration column 106 discussed above. The system 600 also includes a heat exchanger 616 that is, one or more heat exchangers configured to transfer heat between two or more streams) and power generation unit (P1) 618.

As shown in FIG. 6, a sour gas stream 620 is fed to the absorption column 612 of the AGR unit 610 and is treated using a solvent stream 622 from the regeneration column 614, as discussed supra, to produce an acid gas stream 624 that exits the regeneration column 614. A sales gas stream 625 exits the absorption column 612 and may be treated to remove other impurities or useful hydrocarbons or routed to a pipeline for transportation for industrial purposes or power generation. A loaded solvent stream 626 exits the absorption column 614 and is routed to the regeneration column 614. As discussed supra, steam may be provided from the heat exchanger 616 or the power generation unit 618 to provide heat for stripping the $H_2S$ and $CO_2$ and regenerating the solvent to produce the lean loaded solvent stream 622.

As shown in FIG. 6, the acid gas stream 624 exiting the regeneration column 614 is provided to the fuel reactor 604 of the CLC process 602. A $CaCO_3$ stream 628 is also provided to the fuel reactor 604. $H_2S$ from the acid gas stream 624 reacts with CaO in the fuel reactor 604 to produce CaS and water vapor. The $CaCO_3$ from the stream 628 is calcinated in the fuel reactor to produce CaO for the reaction with $H_2S$ from the acid gas stream 624. CaS is separated from the water vapor and remaining gases in the fuel reactor 604 via a suitable solid gas separation device and exits the fuel reactor 604 via the CaS stream 630. The CaS stream 630 is provided to the oxidizer reactor 606.

In some embodiments, the acid gas stream 624 may include hydrocarbons. In such embodiments, the hydrocarbons are reformed into CO, $CO_2$, and $H_2$ in the fuel reactor 604. These gases, remaining $CO_2$, and steam may exit the fuel reactor 604 as a gas stream 632. The gas stream 632 may be provided to the heat exchanger 616 where the stream 632 is cooled and used to produce steam 634. In some embodiments, the steam 634 may be used for as utility steam (for example, in heating applications) or power generation. For example, the steam 634 may be provided to the power generation unit 618 or to the regeneration column 614. A cooled gas stream exits the heat exchanger 616 as stream 636 shown in FIG. 6 and, in some embodiments, may be vented, flared, or combusted in a boiler or gas turbine. In other embodiments, the cooled gas stream 636 may be fed to a gas processing unit to capture $CO_2$ from the stream.

The solid CaS stream 630 from the fuel reactor 604 is provided to the oxidizer reactor 606 where it is oxidized into calcium sulfate ($CaSO_4$). The oxidizer reactor 606 receives an air stream 638 and produces oxygen-lean air (that is, air having no more than 15% oxygen). The oxygen-lean air may be separated from the solid CaSO4 via a suitable solid/gas separated device in the oxidizer reactor 606. In some embodiments, for example, the solid/gas separation device may be cyclone. The separated oxygen-lean air may exit the oxidizer reactor 606 as oxygen-lean air stream 640. As will be appreciated, the oxidation reaction in the oxidizer reactor 606 is exothermic and aids in balancing the chemical looping combustion process 602. A CaSO4 stream 642 may exit the oxidizer reactor 606 and may be purged from the system 600.

The oxygen-lean air stream 640 may be provided to the heat exchanger 616 to aid in the production of steam 632 for utility or power generation purposes. A cooled oxygen-lean air stream exits the heat exchanger 616 as stream 644. In some embodiments, the steam 632 may be used for as utility steam (for example, for heating applications) or power generation.

As discussed above, the steam 634 may be provided to the power generation unit 618. The power generation unit 618 include, for example, a steam turbine that drives an electric generator. In such embodiments, a slip low pressure stream 646 is bled to provide the regeneration column 614 with the appropriate energy for the stripping of the acid gases out of the acid gas-loaded solvent. The remaining steam may be condensed in condensers to produce condensed steam stream 648 and may be provided to the heat exchanger 616 in addition to makeup water stream 650 to produce the require steam and makeup any steam losses.

In some embodiments, the heat used for operation of the regeneration column 614 may be provided from the oxidizer reactor 606 via a thermal linkage between the regeneration column 614 and the oxidizer reactor 606. For example, the thermal linkage may be one or more heat exchangers disposed between the regeneration column 614 and the oxidizer reactor 606, using a fluid to transfer heat to the regeneration column 614 and another fluid to remove heat from the oxidizer reactor 606 such that the fluids exchange heat in the heat exchanger or using the same fluid or solid to transfer heat to the regeneration column 614 and remove heat from the oxidizer reactor 606. In some embodiments, the heat exchanger 616 may be used to heat an air stream 652 so that the air stream 638 provided to the oxidizer reactor 606 is heated before introduction to the reactor 606.

The fuel reactor 604 may be any suitable type of solid/gas reactor known in the art and may, in some embodiments, be a bubbling bed, fluidized bed, or moving bed reactor. In some embodiments, the oxidizer reactor 606 may be a fast riser type reactor. In other embodiments, the oxidizer reactor 606 any suitable type of solid/gas reactor known in the art and may, in some embodiments, be a bubbling bed, fluidized bed, or moving bed reactor. As will be appreciated by those of ordinary skill in the art, bubbling bed, fluidized bed, or moving bed reactors may use a suitable solid/gas separation component such as a cyclone, and that interconnected beds may use sealing loops to prevent gas leakage between the reactors and fluidization mediums to provide for circulation of solids.

Figure 7:
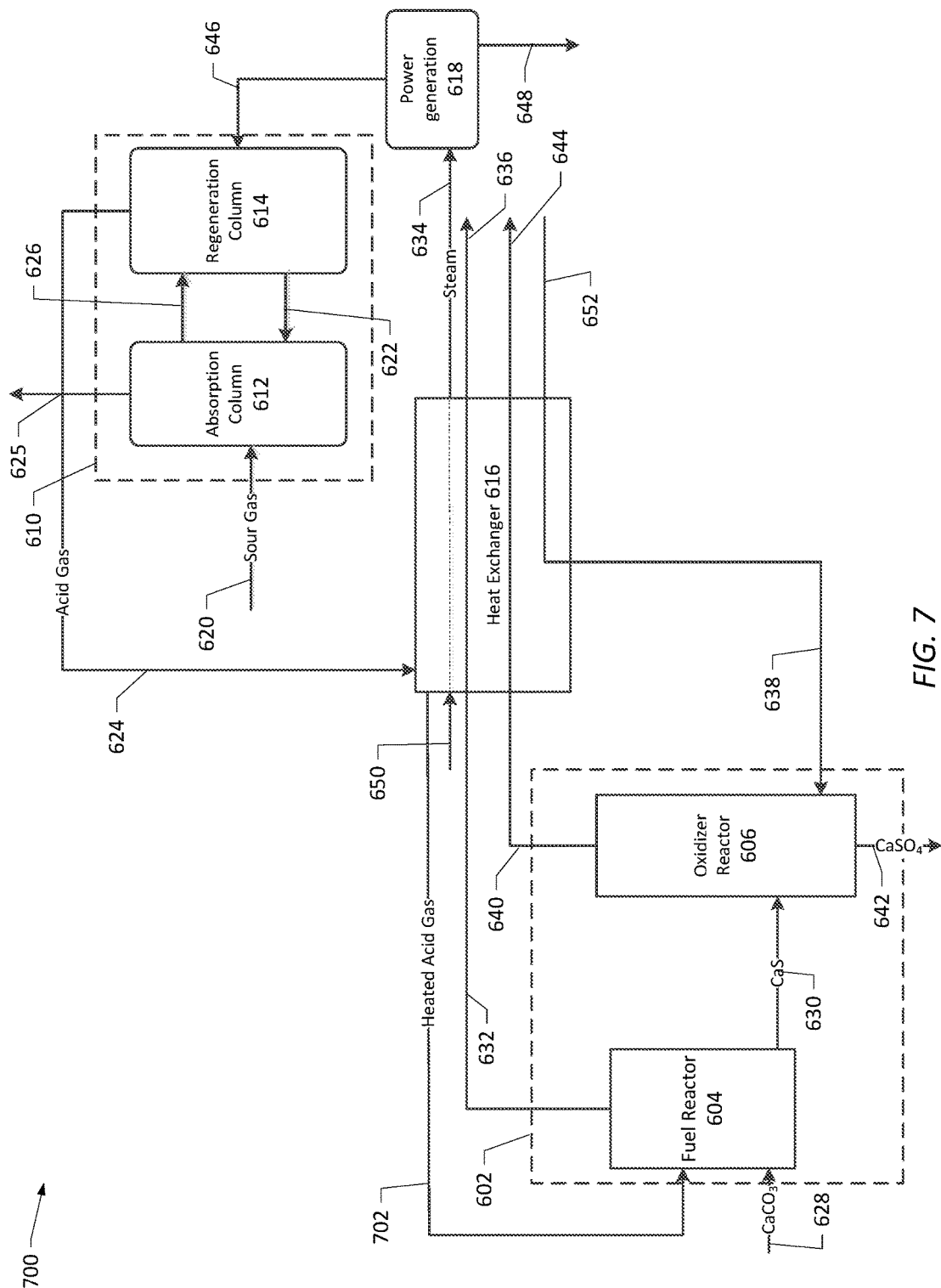
FIG. 7 is a schematic diagram of the system of FIG. 6 that includes preheating an acid gas stream in accordance with an embodiment of the disclosure.

FIG. 7 depicts a system 700 for processing acid gas in a sour gas stream in accordance with another embodiment of the disclosure. As shown in FIG. 7, the system 700 includes the components of system 600 but additionally includes preheating the acid gas stream 624 before providing the acid gas stream to the fuel reactor 604. As will be appreciated, preheating the acid gas stream 624 may reduce the heat requirements of the fuel reactor 604 as compared to directly feeding the acid gas stream to the fuel reactor 604.

As shown in FIG. 7, the acid gas stream 624 may be provided to the heat exchanger 616 before being provided to the fuel reactor 604. The acid gas stream 624 may be heated in the heat exchanger 616 to produce heated acid gas stream 602. The acid gas stream 624 may be heated using the streams provided to the heat exchanger 616, such as the gas stream 632, the gaseous effluents stream 640, or both. As shown in FIG. 7, the heated acid gas stream 602 may be provided to the fuel reactor 604.

Figure 8:
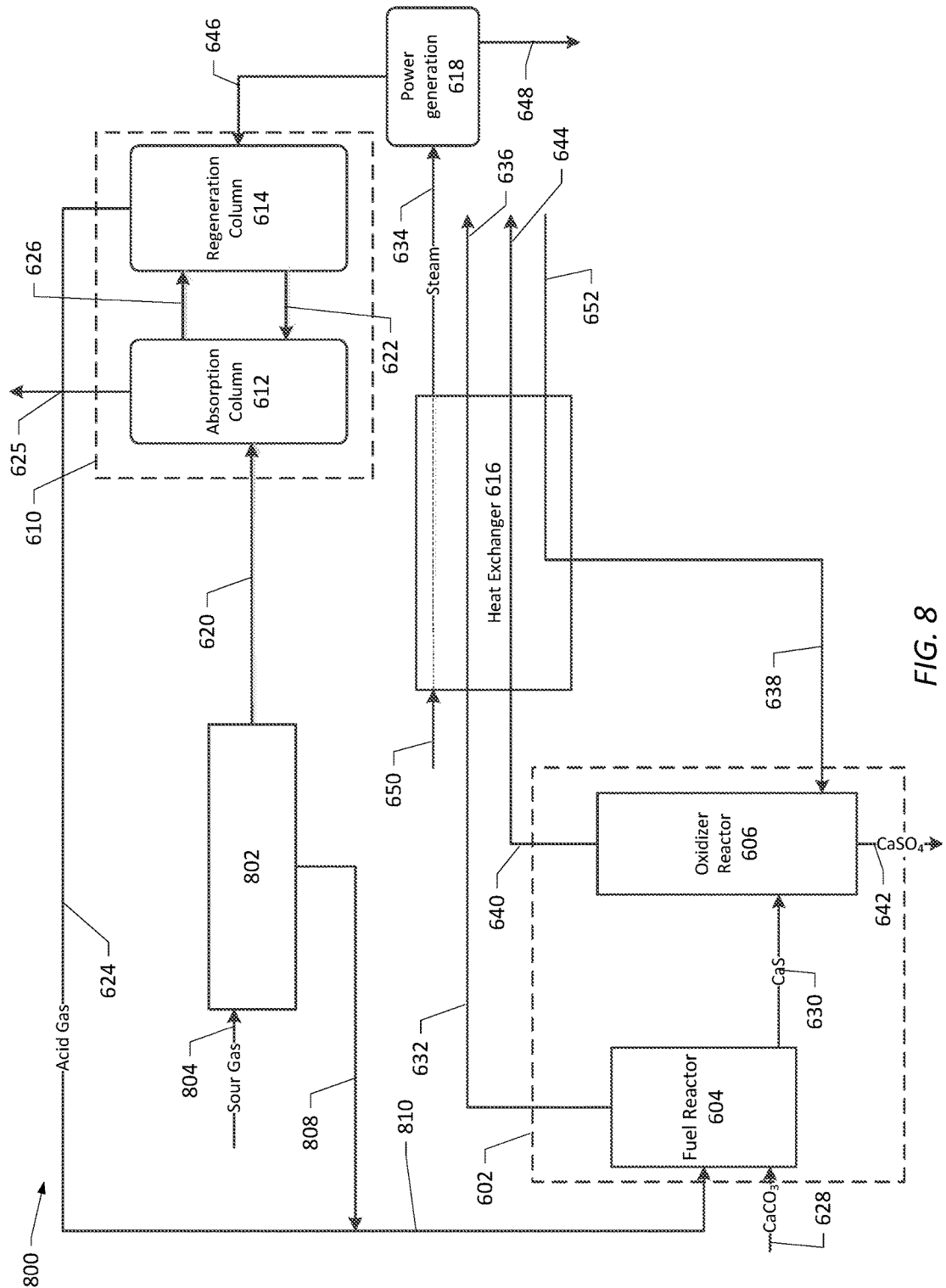
FIG. 8 is a schematic diagram of the system of FIG. 6 with a membrane module in accordance with an embodiment of the disclosure.

FIG. 8 depicts a system 800 for processing acid gas in a sour gas stream in accordance with another embodiment of the disclosure. As shown in FIG. 8, the system 800 includes the components of system 600 but also further includes a selective membrane module 802 disposed upstream of the AGR unit 610.

As shown in FIG. 8, a sour gas stream 804 is provided to the selective membrane module 802. The selective membrane module 802 may operate in a similar manner to the selective membrane module 302 described supra. The selective membrane module 802 may have an $H_2S$ and $CO_2$ selective membrane for removal of $H_2S$ and $CO_2$ from the sour gas stream 804. As shown in FIG. 8, the retentate stream 806 from the selective membrane module 802 having a reduced amount of $H_2S$ and $CO_2$ is provided to the AGR unit 610 for further removal of acid gas components (such as remaining $H_2S$ and $CO_2$). The permeate stream 808 from the selective membrane module 802 may be merged with the acid gas stream 624 exiting the regeneration column 614 to form a stream 810 (referred to as an "acid gas mix") that is provided to the fuel reactor 604.

In the embodiment shown in FIG. 8, the selective membrane module 802 may slip some hydrocarbons in the permeate stream 808, resulting in an increase in the energy content of the synthetic gas stream 632 exiting the fuel reactor 604. In some embodiments, a portion of the sour gas stream 804 may be mixed with the stream 810 to further increase the energy content of the resulting synthetic gas stream 632 exiting the fuel reactor 604, such that the synthetic gas stream 632 may be used in combustion in a gas turbine in a combined cycle or cogeneration application.

As mentioned supra, the selective membrane unit 602 may result in a reduced load on the AGR unit 610, thus reducing solvent losses and stream consumption in the regeneration unit 614. In some embodiments, the selective membrane unit 602 may be retrofitted to exiting systems to debottleneck an AGR unit, such as for expansion of a gas plant.

In some embodiments in which the system 800 is configured to generate power, a different membrane configuration or a slip stream from the sour gas feed 804 may be mixed with the stream 810 to the fuel reactor 604, such that the synthetic gas stream 632 has an increased energy content. In such embodiments, the stream 632 may be provided directly to the oxidizer reactor 606, to a separate combustion chamber or boiler, or to the heat exchanger 616 to be cooled. In embodiments in which the stream 632 is provided to the heat exchanger 616, then the cooled stream 636 may be compressed and fed to a gas turbine operated in a combined cycle or polygeneration cycle to complement the power and stream production.

In some embodiments, the acid gas mix stream 810 may have a decreased amount of hydrocarbons as compared to other embodiments. In such embodiments, the stream 632 exiting the fuel reactor 604 may retain some energy content due to the presence of CO and H2 produced by the hydrocarbon reforming occurring in the fuel reactor 604. In such embodiments, if the energy content of the stream 632 is sufficiently low, the stream 632 may be fed directly to the oxidizer reactor 606 with the air stream 638 for complete combustion of the CO and H2. The resultant product may exit the oxidizer reactor 606 via the stream 640 and be provided to the heat exchanger 616. Such embodiments thus avoid the use of a separate combustion device to combust the stream 632 exiting the fuel reactor 606.

Figure 9:
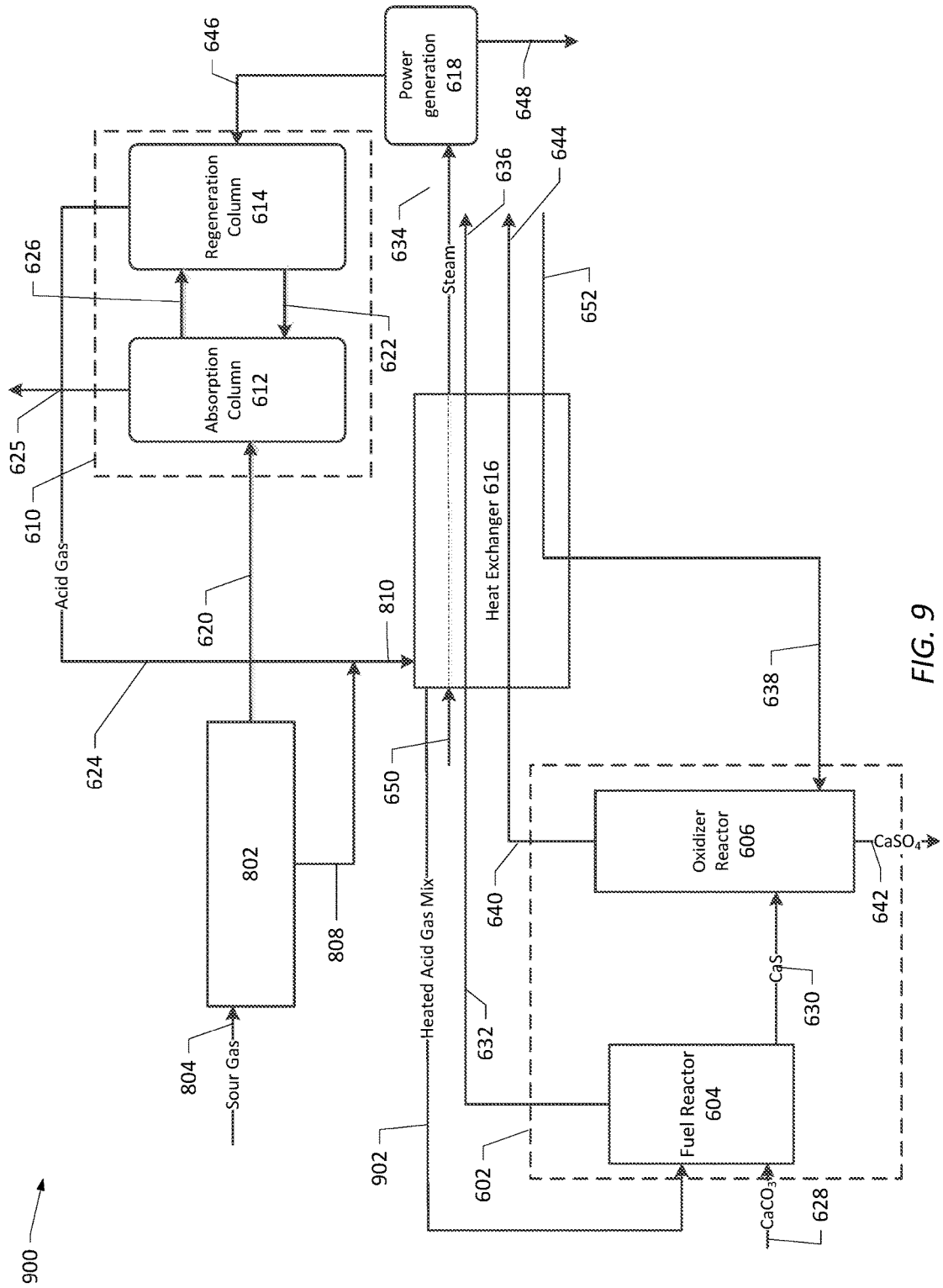
FIG. 9 is a schematic diagram of the system of FIG. 8 that includes preheating an acid gas stream in accordance with an embodiment of the disclosure.

FIG. 9 depicts a system 900 for processing acid gas in a sour gas stream in accordance with another embodiment of the disclosure. As shown in FIG. 9, the system 900 includes the components of system 800 but additionally includes preheating the acid gas mix stream 810 before providing the acid gas mix stream 810 to the fuel reactor 604. As will be appreciated, preheating the acid gas mix stream 610 may reduce the heat requirements of the fuel reactor 604 as compared to directly feeding the acid gas mix to the fuel reactor 604.

As discussed above, the permeate stream 808 from the selective membrane module 802 may be merged with the acid gas stream 624 exiting the regeneration column 614 to form the acid gas mix stream 810. As shown in FIG. 9, the acid gas mix stream 810 may be provided to the heat exchanger 616 before being provided to the fuel reactor 604. The stream 810 may be heated in the heat exchanger 616 to produce heated acid gas mix stream 902. The acid gas mix stream 810 may be heated using the streams provided to the heat exchanger 616, such as the gas stream 632, the gaseous effluents stream 640, or both. As shown in FIG. 9, the heated acid gas mix stream 902 may be provided to the fuel reactor 604.

In the embodiments described in FIGS. 6-9, each reactor of the CLC process 602 may be operated within a temperature range to provide for the expected reactions. For example, in some embodiments, the fuel reactor 604 with the combined calciner function may be operated in the range of about 800° C. to about 1000° C. In some embodiments, the fuel reactor 604 may be operated at about 900° C. The fuel reactor 604 may be operated at a temperature sufficient to provide the selective reaction of CaO with $H_2S$ and to provide for the decomposition of $CaCO_3$.

In some embodiments, the oxidizer reactor 606 may be operated at a temperature in the range of about 850° C. to about 1100° C. In some embodiments, the oxidizer reactor 606 may be operated at a temperature at about 950° C. In some embodiments, the oxidizer reactor 606 may be operated at a temperature of at least 50° C. above the operating temperature of the fuel reactor 604 (for example, at about 950° C. if the fuel reactor 604 is operated at about 900° C.).

Examples

The following examples are included to demonstrate embodiments of the disclosure. It should be appreciated by those of skill in the art that the techniques and compositions disclosed in the example which follows represents techniques and compositions discovered to function well in the practice of the disclosure, and thus can be considered to constitute modes for its practice. However, those of skill in the art should, in light of the present disclosure, appreciate that many changes can be made in the specific embodiments which are disclosed and still obtain a like or a similar result without departing from the spirit and scope of the disclosure.

The embodiments described in FIG. 2 and FIG. 6 without preheating of the acid gas stream were simulated using Aspen Plus® manufactured by Aspen Technology, Inc. located in Bedford, Mass., USA. Table 1 includes the mass flow rate of input streams (in kilograms/second (kg/s)), the composition of output streams (in parts-per-million mass (ppm) or % mass), the reactor operating temperatures, the reactor heat outputs (in megaWatts (MW)), and the sulfur recovery percentage for each embodiment:

TABLE 1

Simulation Results for FIG. 2 and FIG. 4 Embodiments

| | Units | Configuration shown in FIG. 4 (two reactors) | Configuration shown in FIG. 2 (three reactors) |
|---|---|---|---|
| Scenario S recovery (%) | % | 99.57% | 99.85% |
| CaL S recovery (Solid form $CaSO_4$ + CaS) | % | 99.57% | 99.85% |
| $CaCO_3$ make-up | kg/s | 18.8 | 18.7 |
| Fuel reactor Solids feed | kg/s | 18.8 | 10.5 |
| Oxidizer reactor Solids feed | kg/s | 13.5 | 13.5 |
| Calciner Solids feed | kg/s | NA | 18.7 |
| Air flow to Oxidizer reactor | kg/s | 51.3 | 57.1 |
| Fuel reactor Temperature | ° C. | 900.0 | 820.0 |
| Oxidizer reactor Temperature | ° C. | 950.0 | 900.0 |
| Calciner Temperature | ° C. | NA | 904.0 |
| Fuel reactor heat output | MW | −53.1 | −3.2 |
| Oxidizer reactor heat output | MW | 130.7 | 129.9 |
| Calciner heat output | MW | NA | −47.3 |
| Net heat | MW | 77.6 | 79.3 |
| Fuel reactor Gas $H_2S$ content | ppm | 691.0 | 618.3 |
| Fuel reactor Gas $SO_2$ content | ppm | 498.8 | 13.0 |
| Fuel reactor Gas COS content | ppm | 84.7 | 33.3 |
| Fuel reactor Gas $CO_2$ content | % | 65.9 | 51.8 |
| Oxidizer reactor Gas $H_2S$ content | ppm | 0.0 | 0.0 |
| Oxidizer reactor Gas $SO_2$ content | ppm | 2.8 | 0.3 |
| Oxidizer reactor Gas COS content | ppm | 0.0 | 0.0 |
| Oxidizer reactor Gas $CO_2$ content | % | 0.0 | 0.0 |
| Oxidizer reactor Gas $N_2$ content | % | 99.9 | 99.9 |
| Calciner $CO_2$ | % | NA | 10.4 |

As shown in Table 1, both configurations resulted in a sulfur recovery of at least 99.5% without the use of a Claus unit or TGTU.

Ranges may be expressed in the disclosure as from about one particular value, to about another particular value, or both. When such a range is expressed, it is to be understood that another embodiment is from the one particular value, to the other particular value, or both, along with all combinations within said range.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used described in the disclosure are for organizational purposes only and are not meant to be used to limit the scope of the description.

What is claimed is:

1. A system, comprising:
  an acid gas treatment unit operable to treat an acid gas stream comprising hydrogen sulfide, the acid gas treatment unit comprising:
    a fuel reactor operable to receive the acid gas stream and calcium oxide, the fuel reactor further operable to react the hydrogen sulfide with the calcium oxide to produce calcium sulfide and a first gas stream comprising water vapor and carbon dioxide;

an oxidizer reactor operable to receive the calcium sulfide and a first air stream, the oxidizer reactor further operable to produce calcium sulfate and an oxygen-lean second air stream, the oxygen-lean air stream comprising no more than 15% by weight oxygen: and a calciner reactor operable to receive the oxygen-lean second air stream and calcium carbonate, the calciner reactor further operable to produce the calcium oxide and a second gas stream, the second gas stream comprising carbon dioxide.

2. The system of claim 1, comprising one or more heat exchangers operable to receive at least one of the first gas stream, the second gas stream, and the oxygen-lean second air stream, the one or more heat exchangers further operable to produce steam using heat from the first gas stream, the second gas stream, the oxygen-lean second air stream, or any combination thereof.

3. The system of claim 2, wherein the one or more heat exchangers are further operable to heat the first air stream using heat from the first gas stream, the second gas stream, or a combination thereof.

4. The system of claim 2, wherein the one or more heat exchangers are further operable to heat the acid gas stream before the fuel reactor receives the acid gas stream.

5. The system of claim 2, comprising a power generation unit operable to receive the steam from the one or more heat exchangers and produce power and reduced pressure steam.

6. The system of claim 5, wherein the reduced pressure steam is provided to regeneration column of an acid gas removal unit.

7. The system of claim 1, comprising an acid gas removal unit operable to receive a sour gas stream and produce the acid gas stream, the acid gas removal unit comprising an absorption column and a regeneration column.

8. The system of claim 7, comprising one or more heat exchangers operable to transfer heat from the oxidizer reactor to the regeneration column.

9. The system of claim 1, comprising a selective membrane module disposed between a sour gas stream and an acid gas removal unit operable to produce the acid gas stream, the selective membrane operable to produce a permeate stream having an increased concentration of carbon dioxide and hydrogen sulfide as compared to the sour gas stream and a retentate stream having a reduced concentration of carbon dioxide and hydrogen sulfide as compared to the sour gas stream.

10. The system of claim 9, wherein the permeate stream is mixed with the acid gas stream before being received by the fuel reactor and the acid gas removal unit is operable to receive the retentate stream.

11. The system of claim 1, wherein the oxidizer reactor comprises a fast riser reactor.

12. The system of claim 1, wherein the calciner reactor comprises a fluidized bed reactor.

13. A method, comprising:
receiving an acid gas stream and calcium oxide at a fuel reactor of an acid gas treatment unit, the acid gas stream comprising hydrogen sulfide;
operating the fuel reactor to react the hydrogen sulfide with calcium oxide to produce calcium sulfide and a first gas stream comprising water vapor and carbon dioxide;
operating an oxidizer reactor of the acid gas treatment unit to receive the calcium sulfide and a first air stream to produce calcium sulfate and an oxygen-lean second air stream, the oxygen-lean air stream comprising no more than 15% by weight oxygen; and
operating a calciner reactor to receive the oxygen-lean air stream and calcium carbonate and produce the calcium oxide and a second gas stream, the second gas stream comprising carbon dioxide.

14. The method of claim 13, comprising operating one or more heat exchangers to receive at least one of the first gas stream, the second gas stream, and the oxygen-lean second air stream to produce steam using heat from the first gas stream, the second gas stream, the oxygen-lean second air stream, or any combination thereof.

15. The method of claim 14, comprising operating the one or more heat exchangers heat the acid gas stream before receiving the acid gas stream and calcium oxide at the fuel reactor of the acid gas treatment unit.

16. The method of claim 13, comprising operating a power generation unit to receive the steam from the one or more heat exchangers and produce power and reduced pressure steam.

17. The method of claim 15, comprising providing the reduced pressure steam to a regeneration column of an acid gas removal unit.

18. The method of claim 13, wherein the acid gas stream is received from an acid gas removal unit.

19. The method of claim 13, comprising operating a selective membrane module disposed between a sour gas stream and an acid gas removal unit to produce a permeate stream having an increased concentration of carbon dioxide and hydrogen sulfide as compared to the sour gas stream and retentate stream having a reduced concentration of carbon dioxide and hydrogen sulfide as compared to the sour gas stream.

20. The method of claim 19, comprising mixing the permeate stream with the acid gas stream before being received by the fuel reactor.

21. The method of claim 13, comprising removing the water vapor from the first gas stream to produce a $CO_2$ stream when the acid gas stream does not include hydrocarbons.

22. The method of claim 13, comprising operating the oxidizer reactor of the acid gas treatment unit to receive the first gas stream when the first gas stream comprises an amount of carbon monoxide below a first threshold amount and an amount of hydrogen below a second threshold amount.

23. The method of claim 13, wherein operating the fuel reactor comprises operating the fuel reactor at a temperature in the range of 600° C. to 900° C.

24. The method of claim 13, wherein operating the oxidizer reactor comprises operating the oxidizer reactor at a temperature in the range of 800° C. to 1100° C.

25. The method of claim 13, wherein operating the calciner reactor comprises operating the oxidizer reactor at a temperature in the range of 800° C. to 1000° C.

26. A system, comprising:
an acid gas treatment unit operable to treat an acid gas stream comprising hydrogen sulfide, the acid gas treatment unit comprising:
a fuel reactor operable to receive the acid gas stream and calcium carbonate, the fuel reactor further operable to:
produce carbon dioxide and calcium oxide from the calcium carbonate; and
react the hydrogen sulfide with the calcium oxide to produce calcium sulfide and a first gas stream comprising water vapor and carbon dioxide; and an oxidizer reactor operable to receive the calcium sulfide and a first air stream, the oxidizer reactor further operable to produce calcium sulfate and an oxygen-lean second air stream, the oxygen-lean air stream comprising no more than 15% by weight oxygen.

27. The system of claim 26, comprising one or more heat exchangers operable to receive the first gas stream and the oxygen-lean second air stream, the one or more heat exchangers further operable to produce steam using heat from the first gas stream, the oxygen-lean second air stream, or a combination thereof.

28. The system of claim 27, wherein the one or more heat exchangers are further operable to heat the first air stream using heat from the first gas stream, the oxygen-lean second air stream, or a combination thereof.

29. The system of claim 26, wherein the one or more heat exchangers are further operable to heat the acid gas stream before the fuel reactor receives the acid gas stream.

30. The system of claim 27, comprising a power generation unit operable to receive the steam from the one or more heat exchangers and produce power and reduced pressure steam.

31. The system of claim 30, wherein the reduced pressure steam is provided to regeneration column of an acid gas removal unit.

32. The system of claim 26, comprising an acid gas removal unit operable to receive a sour gas stream and produce the acid gas stream, the acid gas removal unit comprising an absorption column and a regeneration column.

33. The system of claim 26, comprising a selective membrane module disposed between a sour gas stream and an acid gas removal unit operable to produce the acid gas stream, the selective membrane operable to produce a permeate stream having an increased concentration of carbon dioxide and hydrogen sulfide as compared to the sour gas stream and retentate stream having a reduced concentration of carbon dioxide and hydrogen sulfide as compared to the sour gas stream.

34. The system of claim 33, wherein the permeate stream is mixed with the acid gas stream before being received by the fuel reactor and the acid gas removal unit is operable to receive the retentate stream.

35. The system of claim 26, wherein the oxidizer reactor comprises a fast riser reactor.

36. A method, comprising:
receiving an acid gas stream and calcium carbonate at a fuel reactor of an acid gas treatment unit, the acid gas stream comprising hydrogen sulfide;
operating the fuel reactor to produce carbon dioxide and calcium oxide from the calcium carbonate and react the hydrogen sulfide with the calcium oxide to produce calcium sulfide and a first gas stream comprising water vapor and carbon dioxide; and
operating an oxidizer reactor of the acid gas treatment unit to receive the calcium sulfide and a first air stream to produce calcium sulfate and an oxygen-lean second air stream, the oxygen-lean air stream comprising no more than 15% by weight oxygen.

37. The method of claim 36, comprising operating one or more heat exchangers to receive at least one of the first gas stream and the oxygen-lean second air stream to produce steam using heat from the first gas stream, the oxygen-lean second air stream, or a combination thereof.

38. The method of claim 37, comprising operating the one or more heat exchangers to heat the acid gas stream before receiving the acid gas stream at the fuel reactor of the acid gas treatment unit.

39. The method of claim 37, comprising operating a power generation unit to receive the steam from the one or more heat exchangers and produce power and reduced pressure steam.

40. The method of claim 39, comprising providing the reduced pressure steam to a regeneration column of an acid gas removal unit.

41. The method of claim 36, comprising operating a selective membrane module disposed between a sour gas stream and an acid gas removal unit to produce a permeate stream having an increased concentration of carbon dioxide and hydrogen sulfide as compared to the sour gas stream and retentate stream having a reduced concentration of carbon dioxide and hydrogen sulfide as compared to the sour gas stream.

42. The method of claim 41, comprising mixing the permeate stream with the acid gas stream before being received by the fuel reactor.

43. The method of claim 36, comprising removing the water vapor from the first gas stream to produce a $CO_2$ stream when the acid gas stream does not include hydrocarbons.

44. The method of claim 36, comprising operating the oxidizer reactor of the acid gas treatment unit to receive the first gas stream when the first gas stream comprises an amount of carbon monoxide below a first threshold amount and an amount of hydrogen below a second threshold amount.

45. The method of claim 36, wherein operating the fuel reactor comprises operating the fuel reactor at a temperature in the range of 800° C. to 900° C.

46. The method of claim 36, wherein operating the oxidizer reactor comprises operating the oxidizer reactor at a temperature in the range of 850° C. to 1100° C.

* * * * *